(12) United States Patent  
Choi et al.

(10) Patent No.: US 8,123,484 B2  
(45) Date of Patent: Feb. 28, 2012

(54) TORSIONAL DYNAMIC DAMPER FOR A WIND TURBINE AND METHOD OF USING SAME

(75) Inventors: Jou-Young Choi, Katy, TX (US); Rasmus Svendsen, Randers NØ (DK); Kim Mittendorf, Katy, TX (US)

(73) Assignee: Vestas Wind Systems A/S, Aarhus N (DK)

( * ) Notice: Subject to any disclaimer, the term of this patent is extended or adjusted under 35 U.S.C. 154(b) by 0 days.

(21) Appl. No.: 13/021,323

(22) Filed: Feb. 4, 2011

(65) Prior Publication Data

US 2011/0150631 A1 Jun. 23, 2011

(51) Int. Cl.
*F01D 5/00* (2006.01)

(52) U.S. Cl. .................... 416/145; 416/244 R
(58) Field of Classification Search .............. 416/244 R, 416/145; 415/119; 290/44, 55
See application file for complete search history.

(56) References Cited

U.S. PATENT DOCUMENTS 2,761,643 A * 9/1956 Ward et al. ................. 248/230.1
(Continued)

FOREIGN PATENT DOCUMENTS

CN 101302995 11/2008
(Continued)

*Primary Examiner* — Edward Look
*Assistant Examiner* — Aaron R Eastman
(74) *Attorney, Agent, or Firm* — Wood, Herron & Evans, L.L.P.

(57) ABSTRACT

A wind turbine includes a tower, a nacelle located adjacent a top of the tower, a rotor coupled to the nacelle, and a dynamic vibration damper coupled to the tower and configured to dampen vibrations induced in the tower in a torsional direction while negligibly effecting vibrations induced in the tower in bending directions. The dynamic vibration damper may be tuned to a resonant frequency of the wind turbine in the torsional direction. A method of retrofitting a wind turbine with a vibration damper is also disclosed.

20 Claims, 4 Drawing Sheets

U.S. PATENT DOCUMENTS

| | | | | |
|---|---|---|---|---|
| 3,509,678 | A * | 5/1970 | Dake | 248/218.4 |
| 4,117,629 | A * | 10/1978 | Ekdahl | 47/67 |
| 4,406,094 | A | 9/1983 | Hempel et al. | |
| 5,234,376 | A * | 8/1993 | Chimner et al. | 464/27 |
| 6,672,837 | B1 * | 1/2004 | Veldkamp et al. | 416/144 |
| 6,695,588 | B1 | 2/2004 | Nielsen | |
| 7,220,104 | B2 * | 5/2007 | Zheng et al. | 416/145 |
| 2004/0213004 | A1 * | 10/2004 | Swee et al. | 362/432 |
| 2006/0115363 | A1 | 6/2006 | Schellstede | |
| 2006/0147306 | A1 | 7/2006 | Zheng et al. | |
| 2006/0277843 | A1 | 12/2006 | Livingston et al. | |
| 2007/0110578 | A1 | 5/2007 | Stommel | |
| 2007/0114799 | A1 | 5/2007 | Riesberg et al. | |
| 2008/0107540 | A1 * | 5/2008 | Bonnet | 416/229 R |
| 2008/0145222 | A1 * | 6/2008 | Schellings | 416/31 |
| 2008/0265478 | A1 | 10/2008 | Smith et al. | |
| 2009/0049767 | A1 * | 2/2009 | Georgakis | 52/167.2 |
| 2009/0142178 | A1 | 6/2009 | Nieuwenhuizen | |
| 2009/0183959 | A1 * | 7/2009 | Klit et al. | 188/267.1 |
| 2009/0250932 | A1 * | 10/2009 | Egedal | 290/44 |
| 2010/0013234 | A1 * | 1/2010 | Sloth | 290/55 |
| 2010/0226785 | A1 * | 9/2010 | Livingston et al. | 416/244 R |
| 2010/0320769 | A1 * | 12/2010 | Miranda | 290/55 |

FOREIGN PATENT DOCUMENTS

| | | |
|---|---|---|
| CN | 201202591 | 3/2009 |
| CN | 101514687 | 8/2009 |
| CN | 201306251 | 9/2009 |
| CN | 101571099 | 11/2009 |
| CN | 101692566 | 4/2010 |
| EP | 1 008 747 | 6/2000 |
| JP | 2000-205108 | 7/2000 |
| JP | 2006-336555 | 12/2006 |
| WO | 2006062390 | 6/2006 |
| WO | 2008074866 | 6/2008 |
| WO | 2009027663 | 3/2009 |
| WO | 2009068599 | 6/2009 |
| WO | 2009080028 | 7/2009 |

* cited by examiner

TORSIONAL DYNAMIC DAMPER FOR A WIND TURBINE AND METHOD OF USING SAME

TECHNICAL FIELD

This application relates generally to wind turbines, and more particularly to a torsional dynamic damper tunable to a resonant torsional frequency of the wind turbine.

BACKGROUND

The typical modern wind turbine is a dynamic system having many moving parts that facilitate converting the kinetic energy of the wind into electrical energy. In this regard, a wind turbine generally includes a cantilevered tower having a lower end rigidly secured to a base or foundation and an upper end that is free or unsupported, a nacelle located adjacent the upper end of the tower and housing a generator capable of converting mechanical energy into electrical energy, and a rotor having a central hub and a plurality of blades supported by the nacelle and capable of converting the kinetic energy of the wind into mechanical energy (e.g., rotation of a shaft). The rotor is operatively coupled to the generator housed inside the nacelle such that when wind of sufficient speed moves across the blades, the rotor rotates to thereby power the generator to produce electrical energy.

Like most dynamic systems, wind turbines are subject to undesirable vibrations that may detrimentally impact the operation and/or structural integrity of the wind turbine. Additionally, vibrations in wind turbines may be exacerbated since the forcing function (e.g., the wind) acting on the structural elements of the wind turbine may be spatially non-uniform and unsteady in time. In any event, these undesirable vibrations often present themselves as bending and torsional vibrations within the wind turbine tower. Moreover, these bending and torsional vibrations may have resonance values (e.g., large amplitude oscillations at a specific frequency) within the operating range of the wind turbine. Accordingly, to minimize damage to the wind turbine, the design should account for these undesirable vibrations.

One design approach is to structurally reinforce the wind turbine so as to alter its vibration response (e.g., make the tower stiffer). Such a solution, however, may be prohibitively expensive, especially as tower heights exceed 60-70 meters and will most likely increase in future designs. Another design approach is to not stiffen the structural elements of the wind turbine, but to allow the vibrations and specifically address their impact through supplemental systems. In this regard, various vibration dampers have been suggested that reduce or minimize the effects of resonant vibrations in wind turbines. These dampers may, for example, reduce the large-amplitude oscillations characteristic of resonant behavior. In one form or another, however, these vibration dampers have certain drawbacks that do not fully address the potential negative impact of resonant vibrations on the wind turbine.

By way of example, vibration dampers have been implemented that are specifically configured to minimize the effects of the resonant frequency in a first bending direction, e.g., movement of the tower back and forth in a direction generally parallel to the wind direction, as illustrated by arrow $B_1$ in FIG. 1. While being generally effective for minimizing the impact of this type of bending vibration on the wind turbine, such vibration dampers fail to adequately address the torsional vibrations acting on the wind turbine, and the wind turbine tower in particular. Thus, damage to the wind turbine may still occur through this unaddressed vibratory mode.

Other vibration dampers have been developed that purportedly address both bending and torsional vibrations. These so-called hybrid vibration dampers, however, also have certain drawbacks which may leave the wind turbine vulnerable to vibration-induced damage. More particularly, hybrid vibration dampers can be difficult to "tune" to the resonant frequency of both bending and torsional vibrations, especially when the respective resonant frequencies differ by a significant amount. In this regard, in many cases, the resonant frequency in the first bending direction is not the same as the resonant frequency in a first torsional direction, e.g., twisting about an axis extending along the length of the tower, as illustrated by arrow $T_1$ in FIG. 1. Thus, when the hybrid vibration damper is tuned to the resonant frequency in the first bending direction, which is typical in current hybrid vibration dampers, the damper is not optimally tuned to the resonant frequency in the first torsional direction. Accordingly, the impact of the torsional vibration on the wind turbine may not be adequately addressed. Thus, while on the one hand the coupled nature of hybrid vibration dampers provides dampening in multiple directions (e.g., in a bending and torsional direction), on the other hand the ability to specifically target the resonant frequency in both directions is compromised. Accordingly, prophylactic measures to minimize damage from undesirable vibrations, and more particularly from resonant torsional vibrations, are not being fully implemented through current vibration damper designs.

Thus, there is a need for a vibration damper that decouples the bending vibration from the torsional vibration and is specifically designed to minimize the effects of torsional vibrations on the wind turbine at its resonant frequency.

SUMMARY

A wind turbine that addresses these and other shortcomings includes a tower, a nacelle located adjacent a top of the tower, a rotor coupled to the nacelle and having a hub and a plurality of blades extending therefrom and configured to interact with the wind to rotate the rotor, and a dynamic vibration damper coupled to the tower and configured to dampen vibrations induced in the tower in a torsional direction while having a negligible effect on vibrations induced in the tower in bending directions. To this end, the dynamic vibration damper may have a mass moment of inertia tensor with cross components equal to about zero. Additionally, the dynamic vibration damper may be generally stiff in the bending directions while being generally flexible in the torsional direction. In one aspect of the invention, the dynamic vibration damper may be tuned to a resonant frequency of the wind turbine in a first torsional direction.

In one embodiment, the dynamic vibration damper includes a mass element spaced from the tower and a connecting member configured to couple the mass element to the tower. The mass element may have a mass moment of inertia tensor with cross components equal to about zero. The mass element may have a monolithic construction or a modular construction suitable, for example, in retrofit applications. The mass element may be axisymmetric so as to have no variations in an azimuthal direction. More particularly, the mass element may be a toroid having, for example, a rectangular cross-sectional geometrical profile (e.g., tubular cylindrical segment). The mass constituting the mass element may be dead mass used for nothing other than the dynamic vibration damper itself. Alternatively, however, the mass constituting the mass element may be useful mass having other uses. In one embodiment, the mass of mass element may include that from an energy storage device, such as, for example, a battery.

Similar to the mass element, the connecting member may likewise have a mass moment of inertia tensor with cross components equal to about zero and may also have a monolithic or a modular construction. Moreover, the connecting member may be generally stiff in the bending directions while being generally flexible in the torsional direction. The connecting member may further include an elastomeric material to further dampen torsional vibrations. In an exemplary embodiment, the connecting member includes a plurality of discrete spacers which extend between the tower and the mass element. The spacers may extend in the radial direction and may be uniformly distributed in the azimuthal direction. The connecting member may further include a collar for coupling the spacers to the tower. In one embodiment, the spacers may be configured as generally rectangular flat plates having a height, width and thickness, wherein the thickness is generally less than the height and width, and the thickness generally extends in the torsional direction (e.g., the direction of flexibility). Such a configuration of the plates provides stiffness in the bending directions while providing some amount of flexibility in the torsional direction.

A method of retrofitting a wind turbine with a vibration damper, wherein the vibration damper includes a mass element configured to be spaced from the tower and a connecting member configured to couple the mass element to the tower, includes obtaining a mass element having a plurality of discrete mass components which collectively define the mass element, and obtaining a connecting member having a plurality of discrete connector components which collectively define the connecting member. The method further includes coupling the plurality of discrete connector components to a tower of the wind turbine, and coupling the plurality of discrete mass components to at least one of the connector components, wherein, once coupled to the tower, the vibration damper dampens vibrations induced in the tower in a torsional direction while having a negligible effect on vibrations in the bending directions. The mass components may be coupled to the connector components prior to the connector components being coupled to the tower. Additionally, the plurality of mass components may be coupled together to form the mass element prior to coupling the mass components to the connector components. Furthermore, the plurality of connector components may be coupled together to form the connecting member prior to coupling the connector components to the tower.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention.

DETAILED DESCRIPTION

Figure 1:
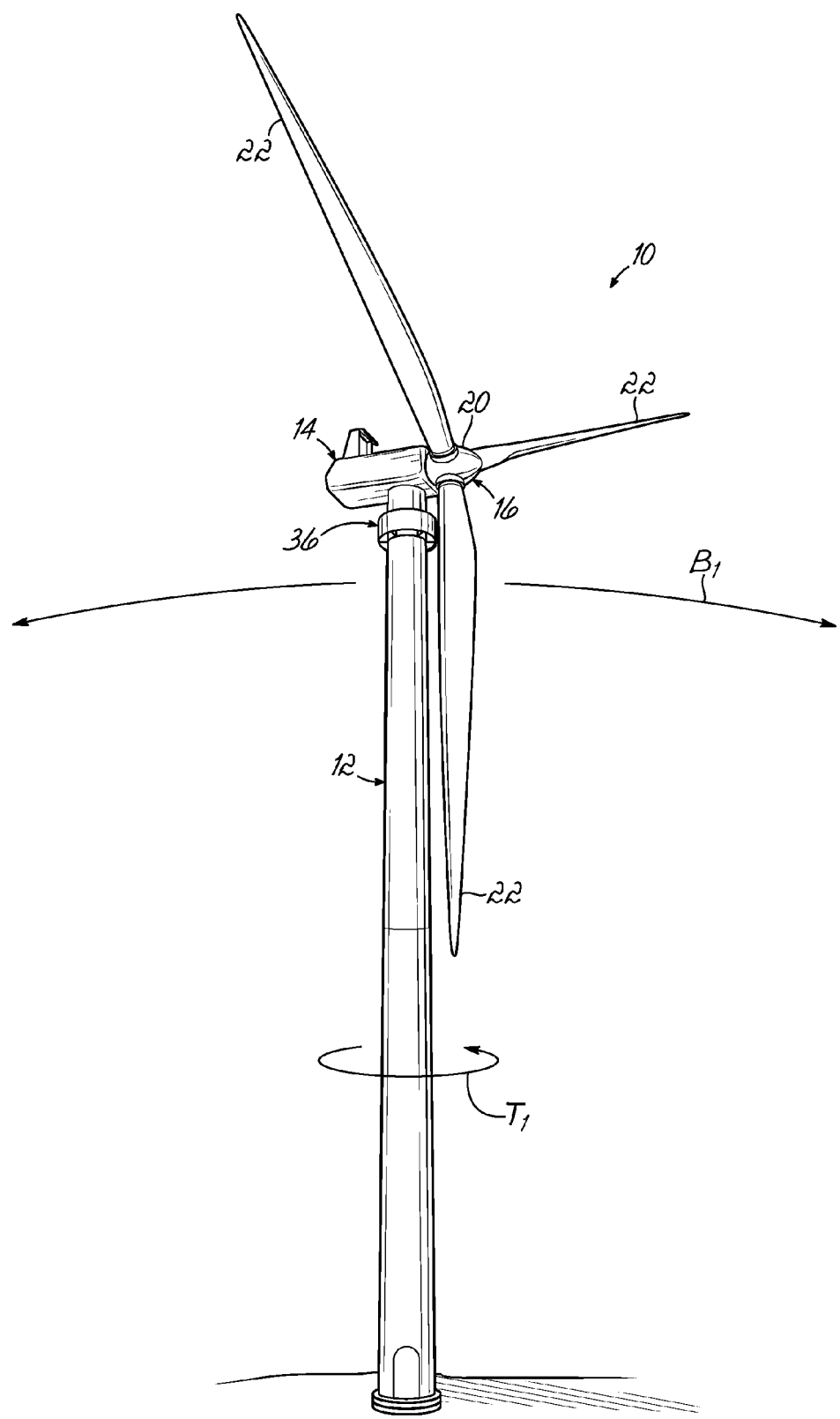
FIG. 1 is a diagrammatic view of a wind turbine having a vibration damper in accordance with one embodiment of the invention.
Figure 2:
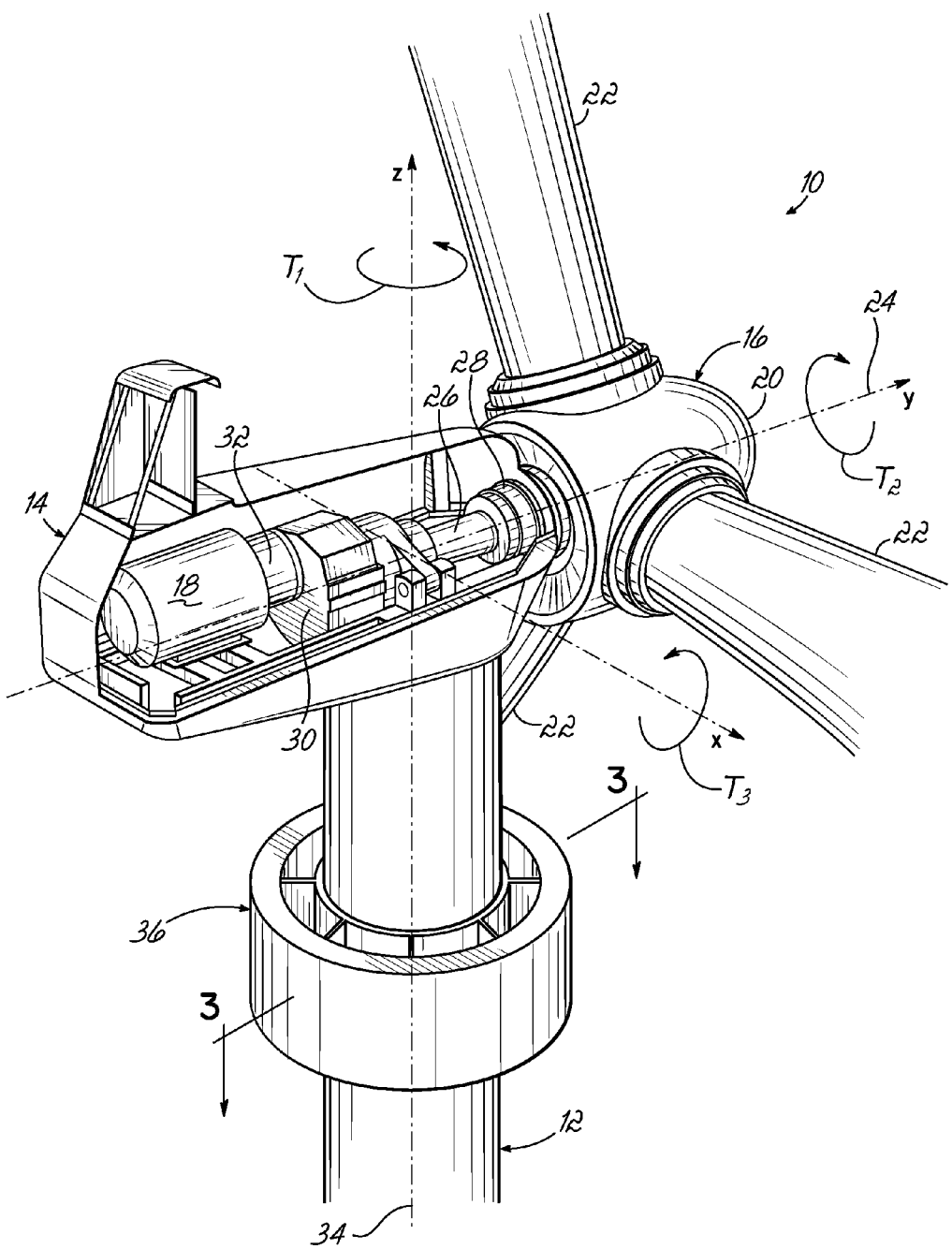
FIG. 2 is a perspective view of an upper portion of the wind turbine of FIG. 1.

With reference to FIGS. 1 and 2 and in accordance with an embodiment of the invention, a wind turbine 10 includes a tower 12, a nacelle 14 disposed at the apex of the tower 12, and a rotor 16 operatively coupled to a generator 18 housed inside the nacelle 14. In addition to the generator 18, the nacelle 14 houses miscellaneous components required for converting wind energy into electrical energy and various components needed to operate, control, and optimize the performance of the wind turbine 10. The tower 12 supports the load presented by the nacelle 14, the rotor 16, and other components of the wind turbine 10 that are housed inside the nacelle 14, and also operates to elevate the nacelle 14 and rotor 16 to a height above ground level or sea level, as may be the case, at which faster moving air currents of lower turbulence are typically found.

The rotor 16 of the wind turbine 10, which is represented as a horizontal-axis wind turbine, serves as the prime mover for the electromechanical system. Wind exceeding a minimum level will activate the rotor 16 and cause rotation in a direction substantially perpendicular to the wind direction. The rotor 16 of wind turbine 10 includes a central hub 20 and a plurality of blades 22 that project outwardly from the central hub 20 at locations circumferentially distributed thereabout. In the representative embodiment, the rotor 16 includes three blades 22, but the number may vary. The blades 22 are configured to interact with the passing air flow to produce lift that causes the central hub 20 to spin about a longitudinal axis 24. The design and construction of the blades 22 are familiar to a person having ordinary skill in the art and will not be further described.

The rotor 16 is mounted on an end of a main rotary shaft 26 that extends into the nacelle 14 and is rotatably supported therein by a main bearing assembly 28 coupled to the framework of the nacelle 14. The main rotary shaft 26 is coupled to a gearbox 30 having as an input the relatively low angular velocity main rotary shaft 26, and having as an output a higher angular velocity secondary rotary shaft 32 that is operatively coupled to the generator 18.

The wind turbine 10 may be included among a collection of similar wind turbines belonging to a wind farm or wind park that serves as a power generating plant connected by transmission lines with a power grid, such as a three-phase alternating current (AC) power grid. The power grid generally consists of a network of power stations, transmission circuits, and substations coupled by a network of transmission lines that transmit the power to loads in the form of end users and other customers of electrical utilities. Under normal circumstances, the electrical power is supplied from the generator 18 to the power grid as known to a person having ordinary skill in the art.

As noted above, wind turbine 10 is a large, complex dynamic system subject to relatively large, non-uniform, unsteady and unpredictable external forcing from the wind. Consequently, wind turbine 10, and more particularly, the tower 12 thereof is often subject to undesirable vibrations during operation of the wind turbine 10. These vibrations may negatively impact the operation and/or structural integrity of wind turbine 10 on a short-term and/or a long-term basis. By way of example, these vibrations are known to cause fatigue in the tower 12 that reduces the service life of the wind turbine 10, which in turn increases the overall cost of the wind turbine 10. For purposes of illustration, and as depicted in FIG. 2, these vibrations may be described in reference to a Cartesian coordinate system, wherein the x-axis lies within a generally horizontal plane and extends in a direction generally perpendicular to the wind direction; the y-axis likewise lies within the generally horizontal plane and extends in a direction generally parallel to the wind direction (e.g., generally parallel to longitudinal axis 24); and the z-axis is in a generally vertical direction and generally parallel to a longitudinal axis 34 extending along a vertical length of the tower 12.

With such a coordinate system defined, the vibrations may be described in reference thereto. In this regard, the vibrations may be described as having bending components (i.e., deflections in the coordinate directions) and torsional components (i.e., rotations about the coordinate axes), which are schematically illustrated by the arrows $T_1$, $T_2$, $T_3$ about the coordinate axes. Of the bending components of the vibration, the component in the y-direction, i.e., tower deflections in the direction generally parallel to the wind, is generally considered the most significant component. This bending component may be referred to as the first bending direction and is illustrated by arrow $B_1$ in FIG. 1. Similarly, of the torsional components, the component about the z-axis is generally considered the most significant component. This torsional component may be referred to as the first torsional direction and is illustrated by arrow $T_1$ in FIGS. 1 and 2.

As noted above, the vibrations in the tower 12 may have a resonance behavior, wherein relatively large-amplitude oscillations occur at certain frequencies, referred to as resonant frequencies. Because the forcing on the wind turbine 10 from the wind may dramatically vary during operation, it may be possible for resonance to be reached during operating conditions. In this regard, the wind turbine 10 may have a resonant frequency in the first bending direction $f_{res, B1}$, and a resonant frequency in the first torsional direction $f_{res, T1}$. As noted above, these two frequencies may not be equal and may, for example, differ by an appreciable amount in certain applications.

As noted above, vibration damper devices are generally known in the art for reducing or minimizing the vibration in the first bending direction $B_1$ at resonant frequency $f_{res, B1}$. Such devices, however, completely ignore the potentially detrimental effects of vibrations in the first torsional direction $T_1$, especially at resonant frequency $f_{res, T1}$. Hybrid vibration damper devices, which are purportedly capable of providing some level of dampening in both the first bending direction $B_1$ and the first torsional direction $T_1$, are generally tuned to the resonant frequency in the first bending direction $f_{res, B1}$, and therefore may not be optimally tuned to the resonant frequency in the first torsional direction $f_{res, T1}$. Accordingly, the potential for the torsional vibration to cause short term and/or long term damage (e.g., fatigue) to the wind turbine 10, and the wind turbine tower 12 in particular, remains.

To address these shortcomings, and in accordance with one aspect of the invention, wind turbine 10 includes a vibration damper, generally shown at 36, specifically designed to reduce or minimize the vibrations in the first torsional direction $T_1$ at resonant frequency $f_{res, T1}$. To this end, vibration damper 36 decouples the bending vibration from the torsional vibration such that vibration damper 36 may be designed to be optimally tuned to the resonant frequency in the first torsional direction $f_{res, T1}$. In other words, the primary, if not sole, focus of the vibration damper 36 is directed to torsional vibrations, and more particularly to torsional vibrations in the first torsional direction $T_1$. Any bending vibrations which may occur in wind turbine 10 during operation, such as those in the first bending direction $B_1$, may be addressed via prior art damper devices, which form no part of the present invention.

In accordance with an aspect of the invention, vibration damper 36 may be configured as a dynamic damper, which operates by effectively dampening a vibration through generation of an out-of-phase inertia-induced vibration that essentially counteracts the primary undesirable vibration. This may be achieved, for example, by strategically coupling a relatively large mass to the tower 12. To be most effective, the mass should be coupled to the tower 12 adjacent a region that would, in the normal course, experience the relatively large-amplitude oscillations at resonance. In the instant case, this would suggest coupling the mass to the cantilevered tower 12 adjacent the nacelle 14 (i.e., the upper free end of the tower 12). In accordance with another aspect of the invention, various features of the mass and/or its coupling to the tower 12 may be selectively chosen such that the out-of-phase, inertia-induced vibration caused by the mass is optimally tuned to the resonant frequency in the first torsional direction $f_{res, T1}$.

In one embodiment, and as illustrated in FIGS. 2-5, the vibration damper 36 includes a mass element 38 and a connecting member 40 configured to couple the mass element 38 to the tower 12. As noted above, it is preferable that the vibration damper 36 be coupled to the tower 12 adjacent the nacelle 14 since maximum tower deflections would in the normal course occur adjacent the upper free end of the tower 12. In one embodiment, the mass element 38 may be configured as a tubular cylindrical segment (e.g., a ring) having an inner surface 42 configured to generally face toward the tower 12, an outer surface 44 configured to generally face away from the tower 12, a generally planar upper surface 46, and a generally planar lower surface 48 generally opposed to upper surface 46. As illustrated in the figures, the mass element 38 may generally have a height $h_m$ and a thickness $t_m$. In one embodiment, the mass element 38 may have a generally circular cross-sectional profile such that the inner surface 42 is at a radius $R_i$, the outer surface 44 is at a radius $R_o$, and the thickness $t_m$ may be defined as the difference between the outer and inner radii. It should be recognized, however, that the mass element 38 may include other cross-sectional profiles and be within the scope of the invention.

Figure 3:
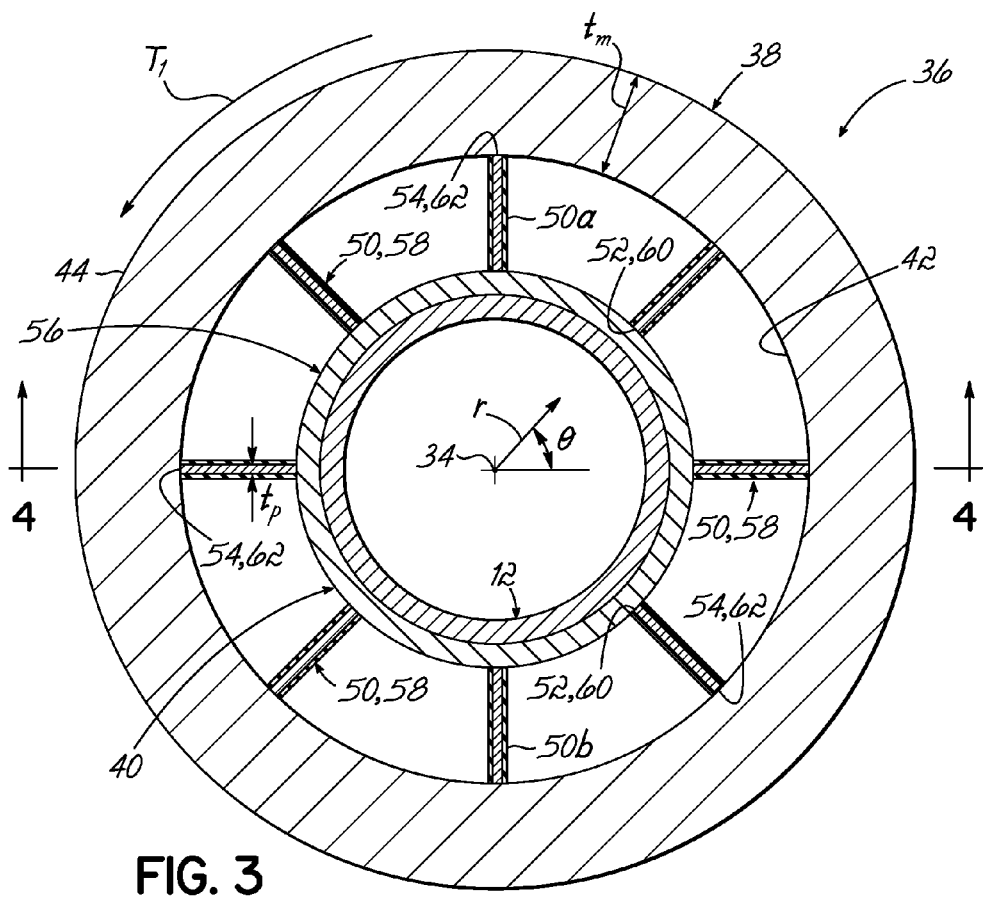
FIG. 3 is a top-plan, cross-sectional view of the vibration damper shown in FIG. 2 taken generally along the line 3-3.
Figure 4:
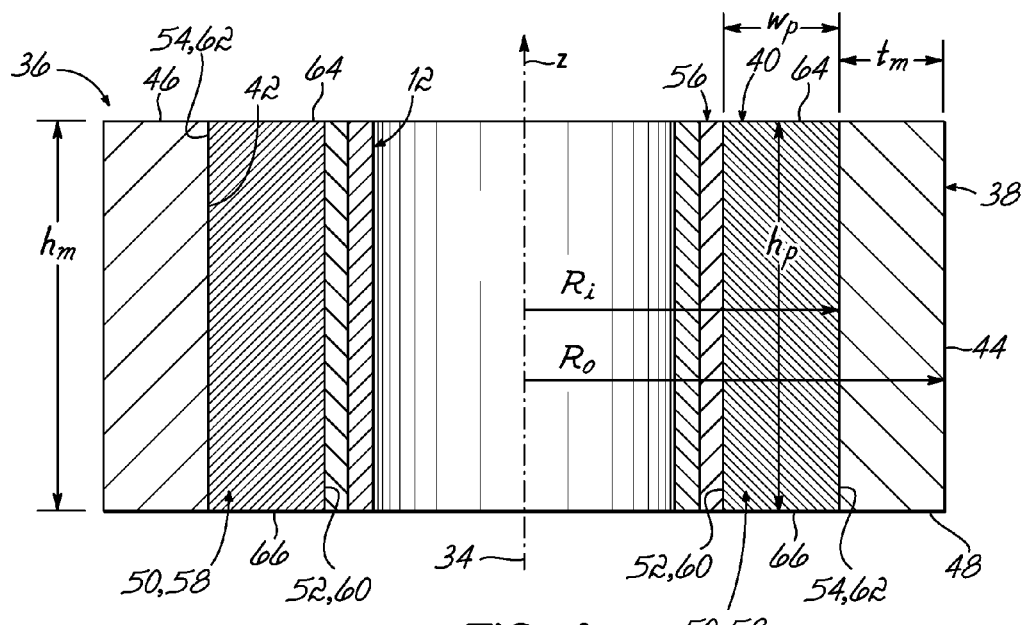
FIG. 4 is side-plan, cross-sectional view of the vibration damper shown in FIG. 3 taken generally along the line 4-4.

In an exemplary embodiment, the mass element 38 may be characterized by a generally uniform distribution of mass about the tower 12 in, for example, both a circumferential or azimuthal direction, denoted by θ in FIG. 3, and in the z-direction, as shown in FIG. 4. The tubular cylindrical segment depicted in the figures is an example of a mass element having such a uniform mass distribution. Other arrangements, however, are also possible. For example, in alternative embodiments, the mass element 38 may be generally uniform in the azimuthal direction, but vary in the z-direction (i.e., the mass element is axisymmetric). By way of example, and without limitation, the mass element 38 may be a toroid wherein the cross-sectional a geometrical profile is rotated about an axis (e.g., the z-axis). When the cross-sectional geometrical profile is a circle, the mass element 38 is a torus. The cross-sectional geometrical profile, however, may have other configurations including triangular, square, pentagonal, hexagonal, octagonal, etc. When the cross-sectional geometrical profile is a rectangle, the resulting toroid corresponds to the tubular cylindrical segment described above and shown in the figures. Other configurations may also be possible. In this regard and perhaps more broadly, the mass element 38 may take a shape such that the vibration has primarily torsional vibration components and the mass element 38 does not dampen or otherwise contribute to vibrations in the bending directions to any significant degree. In other words, the shape, density, etc. of the mass element 38 may be such that the mass moment of inertia I has at most non-zero values along the principle axes $I_{xx}$, $I_{yy}$, $I_{zz}$, and has substantially zero values in the cross components of the inertia tensor, i.e., $I_{xy}$, $I_{yx}$, $I_{xz}$, $I_{zx}$, $I_{yz}$, $I_{zy} \cong 0$. Those of ordinary skill in the art will readily understand how to determine whether a particular mass element 38 meets such a criteria. This ensures that the mass element 38 does not contribute to the vibrations in the bending directions.

Additionally, in one embodiment the mass element 38 may have a one-piece, monolithic construction that is continuous in the azimuthal and z directions. This type of construction of mass element 38 may be suitable, for example, in new wind turbine construction wherein the mass element 38 may be coupled to the tower 12 as the wind turbine 10 is being assembled (e.g., prior to the nacelle 14 being coupled to the tower 12). The invention is not so limited, however, as in an alternative embodiment, the mass element 38 may be formed from a plurality of discrete mass components which may be coupled together to form a continuous mass element (not shown). This modular type of construction of mass element 38 may be suitable, for example, in instances wherein existing wind turbines are retrofitted with a vibration damper such as that described herein. In still a further embodiment, the mass element 38 may not be continuous, but instead be formed from a plurality of discrete mass components which remain spaced apart from adjacent mass components, but yet may collectively define a mass element suitable for purposes of the present invention.

In these various embodiments, the mass element 38 may be made of any suitable material that utilizes mass in a relatively efficient manner, such as by having, for example, a relatively high density. Such materials include, but are not limited to, concrete, steel, and other relatively high density metal and non-metal materials. Those of ordinary skill in the art will recognize other materials suitable for forming mass element 38. In another aspect of the invention, however, the mass that makes up the mass element 38 may not be dead mass, i.e., mass that is used solely for the vibration damper 36, but instead may be useful mass, i.e., mass that has purposes in addition to its use as a vibration damper. By way of example and not limitation, the mass of mass element 38 may be comprised of mass from an energy storage device. More particularly, in one embodiment, the mass that constitutes mass element 38 may be formed from one or more batteries capable of storing electrical energy. These batteries may include both solid-based and liquid-based batteries. Those of ordinary skill in the art may appreciate that other useful mass may be used to constitute the mass of mass element 38.

Figure 5:
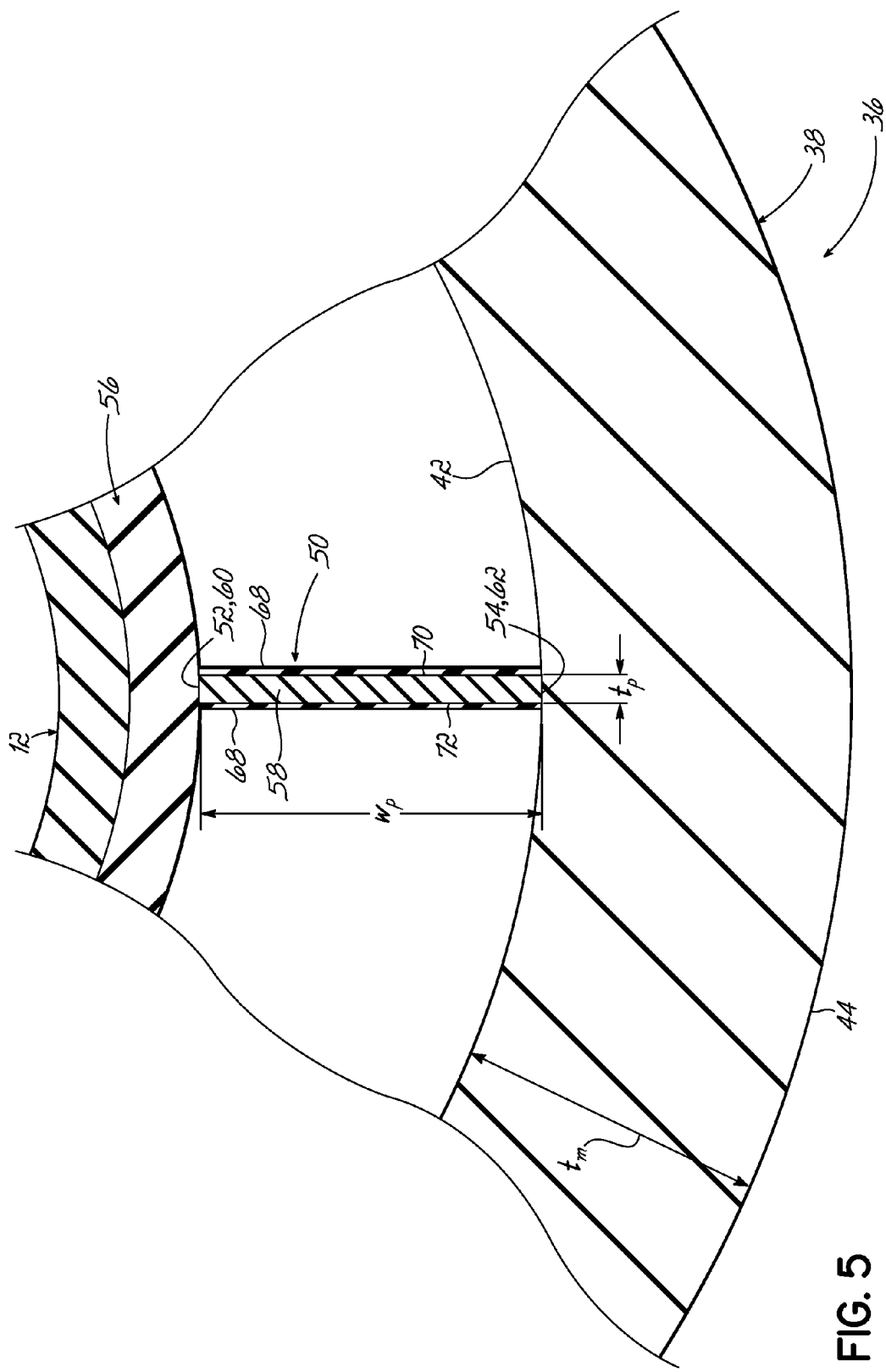
FIG. 5 is an enlarged view of a portion of the vibration damper shown in FIG. 3.

As mentioned above, the connecting member 40 is configured to couple the mass element 38 to the tower 12. In an exemplary embodiment, and as illustrated in the figures, the connecting member 40 may include a plurality of arms or spacers 50 that generally extend between the tower 12 and the mass element 38. In this regard, the spacers 50 may include a first end 52 rigidly coupled to the tower 12 and a second end 54 rigidly coupled to the inner surface 42 of the mass element 38. In one embodiment, the first end 52 of the spacers 50 may be coupled directly to the tower 12 (not shown). In an alternative embodiment, however, and as illustrated in FIGS. 3-5, for example, the first end 52 of the spacers 50 may be rigidly coupled to a generally cylindrical collar 56, which is in turn rigidly coupled to the tower 12. The rigid coupling between the spacers 50 and the tower 12, collar 56 or mass element 38, or between the collar 56 and tower 12 may be achieved through any suitable means including, without limitation, welding and/or bolting arrangements.

Similar to the above, the connecting member 40 may have a one-piece, monolithic construction suitable, for example, in new wind turbine construction, wherein the connecting member 40 may be coupled to the tower 12 (alone or in combination with the mass element 38) as the wind turbine 10 is being assembled (e.g., prior to the nacelle 14 being coupled to the tower 12). The invention is not so limited, however, as in an alternative embodiment, the connecting member 40 may be formed from a plurality of discrete connector components which may be coupled together to form a connecting member 40 (not shown). This type of construction of connecting member 40 may be suitable, for example, in instances wherein existing wind turbines are retrofitted with a vibration damper. In still a further embodiment, the connecting member 40 may be formed from a plurality of discrete connector components which are each coupled to the mass element 38 and tower 12 without necessarily being coupled to each other (not shown). Again, such an embodiment might be suitable for retrofit applications. Such modular connecting members may be utilized in new wind turbine construction as well.

In an exemplary embodiment, and as shown in FIG. 3, the spacers 50 may be oriented so as to extend in a generally radial direction r between the tower 12 and the mass element 38. Moreover, the spacers 50 may be uniformly distributed or spaced in the azimuthal direction. For example, FIG. 3 illustrates eight spacers 50 uniformly distributed about the tower 12. It should be recognized that more or fewer spacers 50 may be utilized in vibration damper 36 and remain within the scope of the present invention. Preferably, however, for each spacer 50a, there should be another spacer 50b directly opposed thereto such that the connecting member 40 is generally symmetric about any plane that contains longitudinal axis 34 (e.g., see FIG. 3) extending along tower 12. Broadly, however, the connecting member 40 (with or without collar 56) should have a configuration such that the mass moment of inertia I has at most non-zero values along the principle axes $I_{xx}$, $I_{yy}$, $I_{zz}$, and has substantially zero values in the cross components of the inertia tensor, i.e., $I_{xy}$, $I_{yx}$, $I_{xz}$, $I_{zx}$, $I_{yz}$, $I_{zy} \cong 0$. Again, this feature in the mass moment of inertia tensor ensures that the connecting member 40 does not contribute to vibrations in the bending directions. In this way, the vibration damper 36 as a whole (e.g., the mass element 38 and connecting member 40) will have these attributes.

Because the vibration damper 36 is configured as a torsional vibration damper, in an exemplary embodiment, the connecting member 40 may be configured to be generally stiff in axial directions/bending directions (e.g., in the r and z directions in the reference frame shown in FIGS. 3 and 4), but provide for a reduced stiffness, and therefore a greater level of flexibility and deformation, in the azimuthal direction/torsional direction (e.g., the θ direction in the reference frame shown in FIG. 3). Such a configuration allows vibration damper 36 to be effective for damping torsional vibrations, but have a substantially negligible effect on damping vibrations in the bending directions. One such configuration of spacers 50 that provide for this criteria (e.g., stiff in axial directions while being generally more flexible in the azimuthal direction) is a flat plate configuration. Accordingly, in one embodiment, the spacers 50 may be configured as generally rectangular flat plates 58 having an inner side edge 60 coupled to the tower 12 or the collar 56, an outer side edge 62 coupled to the mass element 38, an upper edge 64, and a lower edge 66. In general, the plates 58 have a width $w_p$, a height $h_p$, and a thickness $t_p$, wherein the thickness is typically significantly less than the width and height, i.e., $t_p \ll w_p$, $h_p$ to provide the flat plate geometry and is oriented so as to generally extend in the azimuthal direction. These relative dimensions also provide, at least in part, the increased flexibility of connecting member 40 in the azimuthal direction relative to the axial directions.

In one embodiment, the height $h_p$ of the plates 58 may be such that the upper edge 64 is substantially flush with the upper surface 46 of the mass element 38 and the lower edge 66 is substantially flush with the lower surface 48 of the mass element 38 (FIG. 4). However, the invention is not so limited as in alternative embodiments, one or both of the edges 64, 66 may be offset from the surfaces 46, 48 of mass element 38, respectively. The connecting member 40, including the collar 56 (if utilized) and plates 58 in various embodiments, may be formed from suitable materials including, without limitation, steel or other metals.

Although forming the connecting member 40 from a generally rigid material (e.g., steel) is effective for damping torsional vibrations in the first torsional direction $T_1$, for example, the connecting member 40 may include additional aspects that provide some level of active damping of a torsional vibration (e.g., dissipate the torsional energy). In this regard, at least a portion of the connecting member 40 may include an elastomeric material that provides enhanced dampening of the torsional vibration. In this regard, and in one embodiment, the plates 58 may have a laminated construction wherein an elastomeric layer 68 is disposed on opposed surfaces 70, 72 of an internal plate 58 (FIG. 5). The elastomeric layer 68 may be formed from rubber, an asphalt sheet, or other suitable elastomeric materials.

In operation, the wind turbine 10 is subject to a wide range of vibrations, including those in the first bending direction $B_1$ and the first torsional direction $T_1$ (FIG. 1). The vibration damper 36 in accordance with embodiments described herein is specifically configured to address the vibration in the first torsional direction $T_1$, and more particularly to reduce the high amplitude oscillations that typically occur at the resonant frequency in the first torsional direction $f_{res,\ T1}$. In this regard, the vibration damper 36 may be specifically tuned to the resonant frequency in the first torsional direction $f_{res,\ T1}$. In this way, the vibration damper 36 will generate a substantially inertia-induced, out-of-phase vibration that counteracts the primary vibration in the first torsional direction $T_1$ at the prescribed resonant frequency so that the oscillations in tower 12 in the first torsional direction $T_1$ remain relatively small.

The tuning of vibration damper 36 to meet the specific needs in a particular wind turbine 10 is generally known by one of ordinary skill in the wind turbine art based on various mathematical equations and/or on empirical data. Accordingly, these theories and equations will not be discussed further herein. In this regard, however, the vibration damper 36 includes a host of variables that may be selectively chosen so as to tune the vibration damper 36 to the resonant frequency in the first torsional direction $f_{res,\ T1}$. These variables include, without limitation, the mass M of the mass element 38 (as dictated by its physical characteristics, such as its height $h_m$ and thickness $t_m$ and density), the number of spacers 50 disposed about tower 12, the width $w_p$, height $h_p$, and thickness $t_p$ of the spacers 50, the material properties of the spacers 50, the thickness of the elastomeric layers 68, if present, the material properties of the elastomeric layers 68, and possibly other aspects of the design of the vibration damper 36. As mentioned above, one of ordinary skill in the art will recognize how to select these and possibly other variables to tune vibration damper 36 to the resonant frequency in the first torsional direction $f_{res,\ T1}$.

As noted above, the vibration damper 36 may be implemented as part of new wind turbine construction. This may allow the vibration damper 36 to take on certain forms, such as, for example, a continuous, monolithic mass element and/or connecting member which may be coupled to the tower 12 during assembly of the tower 12 itself, or after the tower 12 is assembled and prior to assembling the nacelle 14 to the top of the tower 12. Alternatively, however, the vibration damper 36 may be offered as a retrofit device which may be coupled to existing wind turbines 10. In this regard, it is preferable that the vibration damper 36 be coupled to the tower 12 without disassembling components of the existing wind turbine 10. This may be achieved, for example, by forming the vibration damper 36 in sections which may ultimately be coupled together on site during the retrofit installation, so as to result in the final vibration damper 36. The modular nature of this type of vibration damper may facilitate its use in retrofit applications. The modular design may also be beneficial for other reasons, such as storage and/or transportation purposes.

In summary, the vibration damper as disclosed herein is designed to decouple the bending vibration from the torsional vibration so as to focus primarily, if not solely, on the torsional vibration at its resonant frequency. More particularly, the vibration damper may be tuned to the vibration in the first torsional direction at resonance so as to reduce the oscillations that characteristically occur at resonance and in this direction. Thus, vibration damper more fully addresses the torsional vibratory mode as compared to prior dampers and overcomes their shortcomings, as explained above. As a result, it is believed that fatigue and other damage to the wind turbine tower may be reduced and the service life of the wind turbine increased. Thus, the overall costs of the wind turbine may be reduced making wind-generated power more cost effective and competitive in the market place.

While the invention has been illustrated by a description of various embodiments, and while these embodiments have been described in considerable detail, it is not the intention of the applicants to restrict or in any way limit the scope of the appended claims to such detail. Additional advantages and modifications will readily appear to those skilled in the art. For example, while the vibration damper in accordance with aspects of the invention was described herein in connection with wind turbines having cylindrical towers, it should be recognized that the vibration damper may be beneficial in wind turbines having other tower constructions, such as, for example, a lattice construction. In this regard, lattice towers may be more susceptible to torsional vibrations and thus may be even more suitable for the vibration damper disclosed herein. The invention in its broader aspects is therefore not limited to the specific details, representative methods, and illustrative examples shown and described. Accordingly, departures may be made from such details without departing from the spirit or scope of the general inventive concept.

What is claimed is:

1. A wind turbine, comprising:
   a tower, the tower being subjected to vibrations in a bending direction and a torsional direction during operation of the wind turbine;
   a nacelle located adjacent a top of the tower;
   a rotor coupled to the nacelle and having a hub and a plurality of blades extending therefrom and configured to interact with the wind to rotate the rotor; and
   a dynamic vibration damper coupled to the tower and configured to dampen vibrations induced in the tower in a torsional direction while providing substantially no dampening of vibrations induced in the tower in the bending direction.

2. The wind turbine according to claim 1, wherein the dynamic vibration damper has a mass moment of inertia tensor with cross components equal to about zero.

3. The wind turbine according to claim 1, wherein the dynamic vibration damper is tuned to a resonant frequency of the wind turbine in a first torsional direction.

4. The wind turbine according to claim 1, wherein the dynamic vibration damper has a first stiffness in the bending direction and a second stiffness in the torsional direction that is less than the first stiffness.

5. The wind turbine tower according to claim 1, wherein the vibration damper comprises a mass element spaced from the tower and a connecting member configured to couple the mass element to the tower.

6. The wind turbine according to claim 5, wherein the mass element has a mass moment of inertia tensor with cross components equal to about zero.

7. The wind turbine according to claim 5, wherein the mass element has a modular construction.

8. The wind turbine according to claim 5, wherein the mass element is axisymmetric.

9. The wind turbine according to claim 8, wherein the mass element is a toroid having a substantially rectangular cross-sectional geometrical profile.

10. The wind turbine according to claim 5, wherein the mass element comprises mass from an energy storage device.

11. The wind turbine according to claim 5, wherein the connecting member has a mass moment of inertia tensor with cross components equal to about zero.

12. The wind turbine according to claim 5, wherein the connecting member has a modular construction.

13. The wind turbine according to claim 5, wherein the connecting member has a first stiffness in the bending direction and a second stiffness in the torsional direction that is less than the first stiffness.

14. The wind turbine according to claim 5, wherein the connecting member includes an elastomeric material to enhance dampening of the vibrations in the torsional direction.

15. The wind turbine according to claim 5, wherein the connecting member includes a plurality of discrete spacers which extend between the tower and the mass element.

16. The wind turbine according to claim 15, wherein the spacers are configured as rectangular flat plates having a height, width and thickness, the thickness being less than the height and width and extending in the torsional direction.

17. The wind turbine according to claim 15, wherein the connecting member further includes a collar for coupling the spacers to the tower.

18. A method of retrofitting a wind turbine with a vibration damper, the vibration damper having a mass element configured to be spaced from a tower of the wind turbine, and a connecting member configured to couple the mass element to the tower, comprising:
    obtaining a mass element having a plurality of discrete mass components which collectively define the mass element;
    obtaining a connecting member having a plurality of discrete connector components which collectively define the connecting member;
    coupling the plurality of discrete connector components to a tower of the wind turbine; and
    coupling the plurality of discrete mass components to at least one of the connector components,
    wherein, once coupled to the tower, the vibration damper dampens vibrations induced in the tower in a torsional direction while providing substantially no dampening of vibrations in a bending direction.

19. The method according to claim 18, wherein the mass components are coupled to the connector components prior to the connector components being coupled to the tower.

20. The method according to claim 18, wherein the plurality of mass components are coupled together to form the mass element prior to coupling mass components to the connector components, and the plurality of connector components are coupled together to form the connecting member prior to coupling the connector components to the tower.

* * * * *